May 16, 1961 A. S. FITZ GERALD 2,984,350
DRILL SORTER

Filed Oct. 27, 1958 3 Sheets-Sheet 1

INVENTOR.
Alan S. FitzGerald

May 16, 1961  A. S. FITZ GERALD  2,984,350
DRILL SORTER
Filed Oct. 27, 1958  3 Sheets-Sheet 2

INVENTOR.
Alan S. FitzGerald

May 16, 1961 A. S. FITZ GERALD 2,984,350
DRILL SORTER

Filed Oct. 27, 1958 3 Sheets-Sheet 3

INVENTOR.
Alan S. FitzGerald

United States Patent Office 2,984,350
Patented May 16, 1961

2,984,350
DRILL SORTER
Alan S. FitzGerald, Mill Valley, Calif.
Filed Oct. 27, 1958, Ser. No. 769,921
4 Claims. (Cl. 209—90)

This invention relates to improvements in drill sorters.

The principal object of my invention is to provide a device which will automatically sort drills of various sizes, and then deposit them in slots in a conveniently positioned storage rack, from which they may be identifiably dispensed when required.

The present application is a continuation-in-part of my co-pending applications Serial No. 551,393, filed December 6, 1955, and Serial No. 731,177, filed April 28, 1958.

The arrangements which are described in the prior applications above referred to, comprise certain features relating to structure for the sorting of drills which are broadly claimed in these applications. These features include an aperture decreasing in width from one end thereof to the other, and arrangements for introducing a drill into this aperture and then causing the drill to move along the aperture until it is stopped by reason of the distance between the surfaces of the aperture becoming less than the diameter of the drill, at which point the drill is caused to be ejected from the aperture into its designated slot in the storage rack.

A particular feature of the invention disclosed in my present application, wherein it differs from the arrangements of my co-pending cases, relates to the method by means of which the drill is caused to move along the aperture until it is stopped in the above-described manner, and to be ejected from the aperture into its designated slot in the storage rack. The structure for receiving the drill and causing it to enter the aperture, and the conformation of the said aperture, are similar to the arrangements disclosed in my co-pending applications.

In the arrangements described in the prior applications the drill was caused to travel into the aperture under the influence of gravitational force; it was likewise caused to be ejected from the aperture into the designated slot in the storage rack by the same agency. But the movement of the drill laterally, in a sense, that is to say, at right angles to the axis of the drill, within the aperture, was brought about by permanent magnets, the movement of which was caused by an electric motor.

According to my present invention I make use of gravitational forces for the performance of the complete sorting operation; not only for the entrance and exit of the drill from the aperture, but also as a means of causing the movement of the drill within the aperture.

It is therefore an object of my present invention to provide a substantially more simple and more inexpensive type of drill sorter readily capable of being operated manually, thus dispensing with the need for a source of electric power for the operation of a motor, and more suitable for non-industrial utilization, such as in homes, hobby-shops, or the like.

It is a further object of my invention to provide a manually operated, simplified, drill sorter capable of being manufactered in co-ordination with the automatic drill sorters of my previous applications, such that common sub-assembly structure may be embodied in the different types of apparatus described and disclosed.

These and other novel features which I believe to be characteristic of my invention will be set forth with particularity in the appended claims. My invention itself, however, both as to its organization and method of operation, together with further objects and advantages thereof, may best be understood with reference to the following description, taken in connection with the accompanying drawings, in which:

Figure 1:
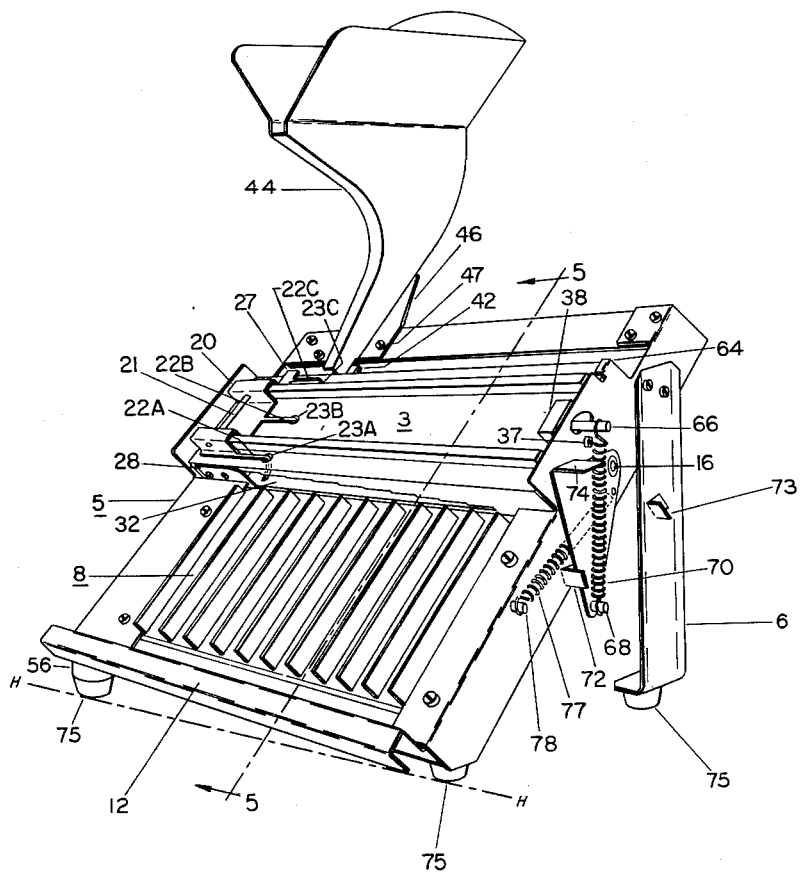
Fig. 1 is a perspective view of an embodiment of my invention as seen from the front.

Referring to the drawings, I show in Fig. 1 a gauging element 3 carried by a substantially hollow base member 5, which is normally held in an inclined position by a pair of legs 6 and 7, of which 6 is visible in Fig. 1.

Mounted on the base member 5 is a drill storage rack 8, which is provided with a plurality of upstanding partitions or septa which divide the rack into separate compartments or slots for receiving the drills.

Figures 2, 4:
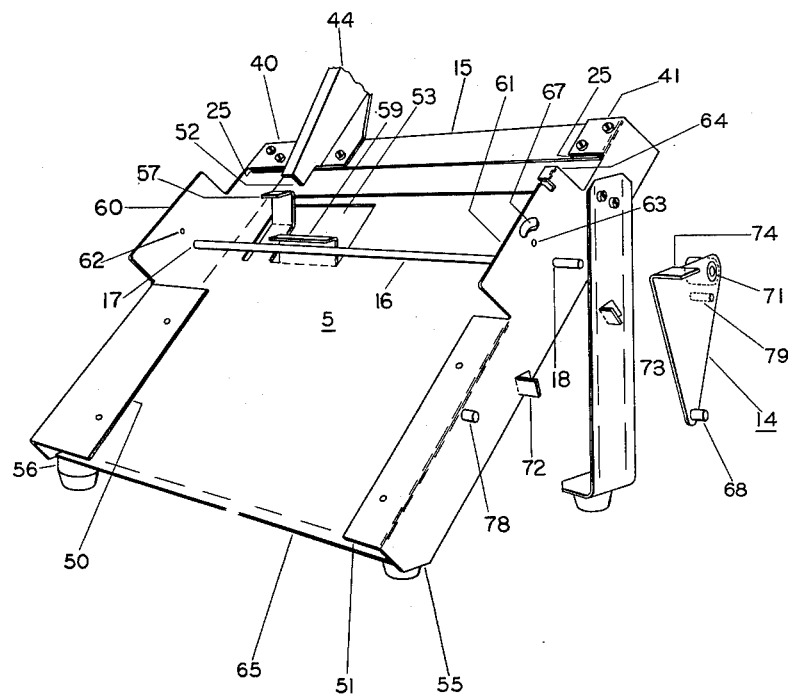
Fig. 2 is a perspective view of the embodiment of my invention shown in Fig. 1 but in which certain components are removed in order to render other portions visible.
Fig. 4 is a front elevation of the gauging member, shown on an enlarged scale.

The gauging element 3 includes an aperture 32, seen in Fig. 4, which may have a stepped configuration substantially similar to the like aperture shown in my co-pending application Serial Number 551,393.

My present invention, it is particularly to be noted, is distinguished from the arrangements of my prior applications in that the gauging element 3 is not rigidly affixed to the base 5, but, instead, is pivoted within the latter, so as to permit limited rotation about a horizontal, longitudinal axis.

Mounted at the rear of the gauging element 3, and towards the left hand extremity thereof, is a hopper 44 which consists of a funnel-shaped member for receiving the drill to be sorted and for directing its passage into the gauging and sorting mechanism of my invention.

I show in Fig. 2 a view of the base member 5, with the rack 8 and the gauging element 3 removed therefrom, in order to render visible details of the structure of my invention that are not seen in Fig. 1. As may be seen in Fig. 2, the base 5 follows the general principle of construction of the corresponding member in my co-pending application Serial Number 731,177, identified by the same reference numeral. It consists, similarly, of a single sheet of material folded to form side walls, a major portion of which, at the bottom, and a lesser portion, at the top, are again inwardly folded to form lateral flanges at top and bottom as seen at 40, 41 and 50, 51. However, intervening sections of the side walls of 5 are partially sheared to provide separation from 40, 41 and 50, 51, and remain without the second fold, so as to form two upstanding brackets 60 and 61, provided with holes at 62, 63 for receiving the pivot screws 36, 37 for supporting the gauging element 3, which are seen in Fig. 4.

Figures 3, 5:
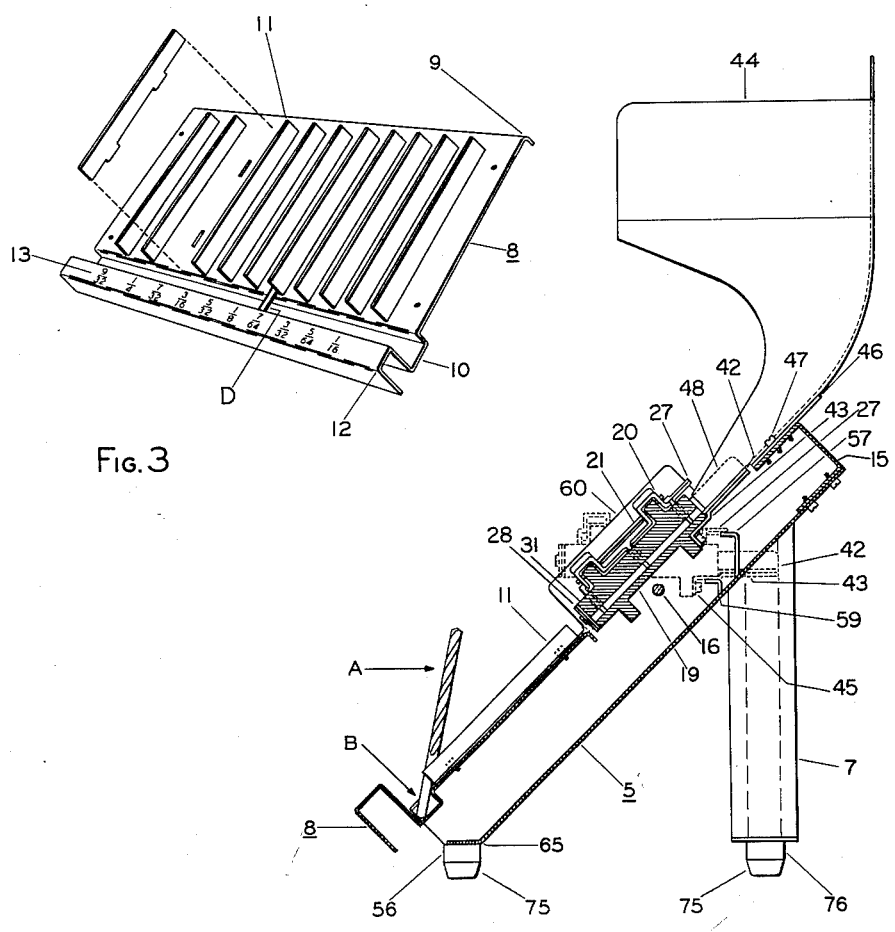
Fig. 3 is a view of the drill storage rack separated from the other components.
Fig. 5 is a cross-sectional view taken along the line 5—5 in Fig. 1.

The lower ends of the base 5 may have the corners chamfered as shown at 55 in Fig. 2, and the bottom of the lower panel may be sheared at the point of each of the two side bends and folded through an angle conformable with the back-to-front angle of inclination of the base 5, as seen in Fig. 5 at 65, in order to provide a horizontal surface for the attachment of rubber feet as shown at 75 in Fig. 1. Similar rubber feet, identified by like numerals, may be attached to the bottoms of the legs 6 and 7 also, as shown in the several figures.

My present invention is further differentiated from the arrangements of my two above cited co-pending applications by the fact that the device is so constructed as to provide an operating posture, not only inclined in the back-to-front direction, but also, though to a substantially less extent, in the lateral sense. Thus according to my present invention, the base member 5 is so supported as to cause the left hand side to be higher than the right hand side by a dimension such that the axis about which the gauging element 3 rotates is displaced from the horizontal by a few degrees, as indicated in Fig. 1 by the chain-dotted line at H—H, which is intended, in the perspective view, to denote the horizontal plane. This lateral tilt may readily be provided by adding washers or distance pieces between the rubber feet 75 and their point of attachment to the left hand side of the base member 5 and to the leg 7, as shown in Figs. 1 and 5 at 56 and 76 respectively. As a result of this lateral inclination I am able to dispense with the permanent magnets and motor of my prior applications; instead, the drill is caused to roll along the aperture to the stop point by gravity.

I show in Fig. 3 the construction of the rack 8. This may be substantially similar to the arrangement shown in Fig. 3 of my co-pending application Serial No. 731,177 and the corresponding components are identified by like numerals. As seen in the drawing the rack 8 may be fabricated from a sheet of suitable material folded to the conformation shown, and having the septa 11 mounted therein by any suitable means of attachment, as by spot-welding, or by the tongue and slot type of assembly illustrated in Fig. 3.

The rack is further folded below the lower extremities of the septa 11 so as to form a recess 10, and is then formed into an upstanding portion as shown in Figs. 1 and 3 at 12. The upper surface of 12 may carry suitable indicia, as shown at 13, to designate the sizes of drills corresponding to the respective slots formed by the septa 11. There is shown in Fig. 3, at D, a drill at rest in one of these slots so as to indicate the manner in which the upstanding portion 12 acts as a stop for the drill when it has entered the slot.

Differing slightly from the conformation shown in my co-pending application Serial Number 731,177, there being no functional requirement for the double bend at the upper portion of 8, I show in Fig. 3 a single bend at 9, in order to present to the drill, when it enters the rack 8, a receptive, curved, surface, rather than a sheared edge upon which the drill might tend to catch; the purpose of this feature is more clearly evident on reference to Fig. 5.

I show in Fig. 4 a separate view of the gauging element 3, a central portion being omitted and the two ends being shown in fragmental form, in order to permit their depiction on an enlarged scale. This view represents a front elevation with the gauging element 3 in a horizontal position.

The gauging element 3 is similar in principle to the corresponding structure of my co-pending application Serial Number 551,393. It is preferably to be manufactured in the form of a single die-cast unit. However, in Fig. 4, in order to facilitate description and explanation of its several distinct features, it is shown as divided into a plurality of separate portions. If desired it may be so constructed, the parts being separately manufactured and being secured together, by screws or other suitable means not shown in the drawings.

Thus the gauging element 3 comprises an upper portion 31, the top surface of which is provided with stiffening webs as seen in Figs. 1 and 5, the bottom surface being plane, and a lower portion 19 of similar shape. The upper and lower portions 31 and 19 are joined together at their ends by two spacing sections 33 and 34 which are of equal thickness, so as to form therebetween the aperture 32. The aperture is provided with a stepped configuration similar to the arrangement of my co-pending application Serial Number 551,393, by there being also joined to the plane surface of the upper portion 31, a step-section 35 having an upper plane surface, and having formed on its lower surface a plurality of gauge steps according to the designated series of drills to be accommodated.

It will be apparent to those skilled in the art that, in the event it may be preferred that the step-section 35 be furnished as a separate component, the same basic structure may be applicable to a number of different ranges of drill diameters, or to different series or categories of drills, by assembling different types of the step-section 35 as required.

It will be noted that the step-section 35 is somewhat shorter than the distance between the spacing sections 33 and 34, so that there remains, at the left hand end of the aperture 32 an enlarged portion thereof, 30, which forms an entering portal through which the drills may be introduced into the aperture 32.

At the ends of the gauging element 3, in the centers of the end surfaces of the sections 33 and 34, I provide two pivot-screws 36 and 37 which, when 3 is assembled within the base 5, are carried by the holes 62 and 63 seen in Fig. 2. These holes are so positioned in the brackets 60 and 61 of the base 5 as to cause the upper surface of 19 to lie in exactly the same plane as the upper surface of the rack 8, when the gauging member 3 is at the extreme limit of its angular displacement in the counter-clockwise sense as viewed from the right hand side of the drawings. Accurately to determine this limit of motion I provide a suitable stop tab, by shearing and bending a portion of the right hand supporting bracket 61, as shown at 64.

At the right hand extremity of 3 there is attached to the upper surface of 31, or formed integrally therewith, according to the desired method of manufacture, an anchor bracket 38, bearing a post 66. As seen in Fig. 1 this post 66 passes through a crescent shaped aperture 67 in the bracket 61, seen in Fig. 2, and so shaped as to permit free movement of the post 66 in accordance with the motion of 3 through an angle of approximately 45 degrees; that is to say its displacement from the position shown in Fig. 1 with the upper surface of 19 aligned with that of 8, to the position in which the upper surface of 19 is, in the back-to-front direction, horizontal.

I show in Fig. 5 a cross-sectional view through a plane as indicated at 5—5 in Fig. 1. This is a vertical section viewed as from the right with the line of sight parallel to the major surfaces of the base 5; that is to say, not the true horizontal plane of H—H in Fig. 1.

In Fig. 5 I show, in full lines, the normal position of the gauging element 3; that is to say the position in which it is arested by the stop tab 64, so that the upper surface of 19 is aligned with that of 8. I also show in Fig. 5, in broken lines, the main outline of the gauging element 3 when this is tipped backwards into a horizontal position.

Referring to Fig. 1, it is to be noted that the upper portion of the hopper 44 is substantially similar to the corresponding element described in my above cited co-pending applications. In accordance with the present invention, however, the lower or throat portion of 44 is slightly modified.

The hopper 44, as in my co-pending application Serial Number 731,177 is supported by a cross-member 15 which may form a closure of the space between the two side walls of 5 at the upper end thereof. As seen in the several drawings, the member 15 consists of a sheet of material, which may be similar to that from which 5 is fabricated, folded into the form of a channel, the upper web of which is secured to the under sides of the flanges 40, 41 by means of the screws shown in the drawings. In like manner the lower web of 15 may be secured to the upper portion of the lower panel of the base 5.

As in my co-pending application above referred to, the hopper 44 is provided with a mounting plate 46 both to provide a suitable measure of rigidity, in view of the fact that the hopper 44 as a whole may suitably be made from relatively thin stock, and in order to provide for its convenient attachment to 15 by means of screws as seen at 47.

Should it be considered undesirable to bend the flanges 40, 41 along a line different from that to which 50 and 51 are folded, there may be included, if desired, the shims shown at 25 between the flanges 40, 41 and the channel 15, for the purpose of determining, with precision, the exact alignment of the throat section of 44 in relation to the plane of the upper surfaces of the rack 8 and the lower portion 19 of the gauging element 3, which alignment is functionally significant.

In Fig. 2 the lower portion only of the hopper 44 is shown, the complete member having been fully depicted in Fig. 1. The difference between the construction of the lower or throat portion of 44 in the present application, and the arrangement of my above cited co-pending application, arises from the fact that, in the prior case the gauging element 3 is stationary, whereas in the present invention this member is movable.

Referring to Fig. 2, if we consider the throat portion of the hopper 44 to have four walls, right, left, upper and lower, the difference in structure, adjacent to the portal 30, is as follows. The upper wall, as previously, remains unchanged and is complete. The right-hand wall, previously including the aperture 52, referring to my two above cited co-pending applications, is now closed. The lower wall extends downwards towards the portal 30 incompletely, being absent from the lower extremity of 44 through a longitudinal distance from 30 which should exceed the dimension by which the longest drill contemplated may extend upwards externally from 30. In other words, the aperture 52 is now in the lower wall instead of the right hand one. In Fig. 2 the portion of 44 where the lower wall is absent is indicated at 52, the same reference numeral being employed, since, though in a different position, the function is analogous. Replacing the above mentioned absent portion of the lower wall of the throat of 44, I provide a guide surface 42, carried by a bracket 43, affixed to the lower surface of 19 at 45. The guide surface 42 should provide a smooth continuous transition between the upper surface of the lower wall of 44, shown in broken lines, and the upper surface of 19. It is to be noted that when the gauging element 3 is tipped back to the horizontal position, the guide surface 42 moves also therewith as a result of which the right hand side wall of the lower portion of 44 presents no obstacle to the lateral motion of the drill as it rolls down the aperture 32.

The left hand wall of the throat of 44 may, optionally, be left complete; or it may be omitted like the lower wall, as shown in the drawings, the left hand side of 42 being folded upwards, as shown in Fig. 5 at 48, thereby stiffening 42, to take its place.

As shown in Fig. 2 a section of the rear panel of the base 5 is removed at 53 in order to provide clearance for 42 when 3 is tipped back.

Referring again to Figs. 1, 4 and 5 I show, at the left hand extremity of the gauging element 3, a gating rocker 20. This member is so formed, by any suitable method of construction, such as by plural folding of sheet material as shown, that its under side has a configuration compatible with the webbed profile of the upper portion 31 of 3, in order that it may be capable of a limited rocking movement about a pivot-spindle 21 which passes through the webs of 31 and corresponding portions of 20. The gating rocker 20 is furnished with three claw-like extension or fingers 22A, 22B, and 22C, which pass freely through three holes 23A, 23B, and 23C in 31 at a point between the portal 30 and the first step in the gauge block 35. In Fig. 4 I have shown a portion of the web of 31, to the left of the centerline of the spindle 21, in cross section, in order to depict therewithin a compression spring 24, in a blind hole 26, by means of which the rocker 20 is constrained to move in a clockwise sense. As a result the extremities of the fingers 22A, 22B, and 22C, are normally held in contact with the upper surface of 19, thereby, as long as they are in this position, precluding movement of any drill out of the portal 30 and into the gauging aperture 32. The fingers 22A, 22B, and 22C, passing through the holes in 31, may be seen, for example, in the aperture 32, in Fig. 5.

At the rear of the rocker 20, and to the right of the spindle 21, I provide a further extended portion thereof, forming a tab 27, as seen in Figs. 1 and 5.

I show also in Figs. 1 and 5 a stop-plate 28, affixed to the front surface of the spacing block 33 by means of the screws seen in Figs. 1 and 5, the holes for which are seen at 29 in Fig. 4. The stop-plate 28 is omitted in Fig. 4 in order to render completely visible the full extent of the finger 22A, and to show at D the position of a drill, confined within the portal 30 by the fingers 22A, 22B, 22C. It is to be understood that the stop-plate 28 should extend a sufficient distance along the lower end of the portal 30 to embrace the center of the smallest drill for which the device is designed, when the drill is in the position shown at D in Fig. 4, that is to say in contact with the fingers 22A, 22B, 22C.

In connection with the design of the gating rocker 20, the stop-plate 28, and other features of my invention which pertain to the guidance of the drills through the process of sorting and delivering them to the proper locations in the rack 8, I wish to point out a particular aspect of this operation which presents a problem of some difficulty which I have successfully solved in this and my preceding disclosures. This has reference to the ranges of sizes of drill which my several different arrangements are capable of embracing. For example a No. 52 or a one-sixteenth inch drill may be less than two inches in length and may weigh as little as half a gram. On the other hand drills of sizes in the neighborhood of, say, ⅜ inch in diameter may be about five inches long and may weigh one hundred times as much.

Thus, referring to Figs. 1 and 4, the rocker 20, for some sizes of drills may be entirely unnecessary; whereas the smaller, shorter and lighter drills are much less readily disciplined. The primary function of the rocker 20 is to prevent a drill from commencing to move from the portal 30 before 3 has been completely tipped back to the horizontal position; especially to prevent any of the smaller drills from assuming a position other than that in which the axis of the drill is normal or at right angles to the longitudinal dimension of 3. The reason for this is that if the drill, when it commences to roll, is not in this right-angle attitude, it will not track correctly as it rolls along the aperture 32. The rocker 20 ensures that the drill cannot leave the portal 30 until the gauge member 3 is in the proper position. In its absence small drills will start to move before 3 has reached its terminal position, and will assume a posture askew the proper right-angle tracking attitude; or they will initially bounce off the stop plate 28, and assume some other inoperative position.

Similar considerations render it preferable that the rocker 20 be provided with three fingers 22A, 22B, 22C, as shown, rather than two, which would be adequate if all the drills were of similar length.

The stop-plate 28 is preferably made of a somewhat hard, durable, non-magnetic material such as Phosphor bronze or the like. It is undesirable that there be used a material that will readily be pitted by the impact of the points or shanks of drills repeatedly impinging thereon. I have found that it is an advantage if the stop plate 28, instead of being precisely flat, be bent very slightly outwards or downwards, that is to say divergent from the plane of the lower, external surface of the spacing section 33, to the right of the holes 29 at the bottom of the portal 30. This more readily releases the frictional engagement between the bottom of the drill and 28; and is favorable to satisfactory tracking.

Referring now to Figs. 2 and 5, in the process of removing the section of the lower panel of the base 5 at 53, to provide for the excursion therethrough of 42 and 43, I provide two tongue-pieces provided with stop-tabs at 57 and at 59. As indicated by the dotted lines in Fig. 5, when the gauging element 3 is rotated about the pivot-screws 36 and 37 in a clockwise direction, as viewed from the right, the lower surface of 43 engages the stop tab 59 when the back-to-front plane of the upper surface of 19 is horizontal. The stop tab 57 is formed somewhat higher and engages the tab 27 of the rocker 20 before the gauging member 3 has completed its backward-tipping movement, to the effect that the completed travel of 3 causes the stop tab 57 to lift the tab 27 of the rocker 20, against the resistance of the spring 24. This causes the fingers 22A, 22B, 22C to be retracted, through the holes 23A, 23B, 23C, from the portal 30, as a result of which the fingers 22 are no longer effective in preventing a drill from leaving the portal 30.

The structure which I have so far enumerated comprises the basic essentials necessary for the effective operation of my drill sorter by one familiar with its action. This will now be described and explained. Further structure rendering the action more automatic when the drill sorter is operated by a person not possessing previous knowledge of the device, will thereafter be disclosed.

The device being assumed to be in the receiving position, in which it is depicted in Figs. 1 and 5, the drill may be dropped casually into the hopper 44 preferably, though not essentially, shank first. Though operable, it is undesirable to present the drill cutting edge first because it may result in unnecessary wear both on the latter and on portions of the hopper on which it may impinge.

The drill, under the action of gravity, passes through the throat of 44 and slides over the guide surface 42 into the portal 30 and is therein arrested by the stop-plate 28 and retained by the fingers 22A, 22B, 22C.

The gauging element 3 may now, manually, as by grasping the post 66, be sharply tipped backwards against the stop tab 59. In so doing the tab 27 engages with the stop tab 57 which causes the fingers 22A, 22B, 22C to be retracted. The back-to-front plane of the upper surface of 19 is now horizontal, and, in view of the fact that the left-hand end of 3 is slightly higher than the right-hand end thereof, the drill is now released to roll, under the influence of gravity, along the aperture 32 until it is arrested by a step in the under surface of 35 which its diameter does not permit it to pass. The operator may now, with the same type of action, return the gauging element 3 to the original Fig. 1 position: whereupon the drill drops out of the aperture 32, passing smoothly from the plane surface of 19 on to that of the rack 8, which, as has been explained with reference to the stop tab 64, is in alignment with the former. The drill is thus delivered into its designated slot in 8.

I have found, however, that successful performance of the device is not always achieved if the above manual movements are performed in too leisurely a manner. Some slight impact effect is desirable in order to initiate the rolling of the drill as well as to dislodge it from its engagement with the step in the section 35. Furthermore, if the gauging element 3 be returned to the sloping position of Fig. 1 with a rate of motion so slow that the drill disengages from the aperture before the movement of 3 has been completed and the aperture has reached the position of alignment with the surface of the rack 8, the drill may fall clear of the rack 8 altogether.

While it may take only a matter of seconds to acquire the modicum of dexterity needed to actuate the device, I prefer to provide a drill sorter which will automatically perform with equal effectiveness for a person using it for the first time as for one familiar with its action. This result I accomplish by providing a snap-action toggle-spring arrangement in which the action which takes place is, as to the speed of motion, not under the control of the user of the device.

Thus I show in Fig. 1 a triangular lever mounted on the right hand side wall of the base 5. This triangular lever is seen in Fig. 2 at 14, where it is depicted as being partially dismantled so as to be separated from the base 5, in order more clearly to designate, by the reference numerals, its several subsidiary elements, and to render visible the extension of the shaft 16 on which it is mounted. As shown in Fig. 2 the shaft 16 is carried by two holes 17 and 18 in the two side walls of the base 5.

Referring to Figs. 1 and 2 it will be seen that the triangular lever 14 is provided with an outwardly projecting post 68 which is located thereon at a point such that, as 14 pivots upon the shaft 16, a line connecting the two posts 66 and 68 would pass across the axis about which the gauging element 3 pivots. If, therefore, there be provided a tension spring connecting the two posts 66 and 68, as shown in Fig. 1 at 70, a toggle action will result.

As shown in the drawings the triangular lever 14 is provided with a boss or hub 71 for securing it to the shaft 16, and the limits of movement of 14 are set by stop tabs 72 and 73 pierced and angled from the side wall of the base 5, and the supporting leg 6, respectively. A portion of the lever 14 is bent over at 74 so as to form a tab or finger plate by means of which the device may conveniently be actuated manually.

It will be apparent to those skilled in the mechanical arts that the action of the toggle spring 70 will be such that, when the triangular lever 14 is operated by the tab 74 from one extremity of its travel to the other, the gauging element 3 cannot thereby be slowly moved through its range of angular displacement, but will, rather, snap suddenly from the sloping position to the horizontal position, when 74 is depressed. In like manner when 74 is raised 3 will snap back to its original inclined position.

This arrangement is satisfactory in that it removes the speed of motion of 3 from the control of the operator. It has, however, the disadvantage that it permits the device to be left, by inadvertence, with the gauging element 3 in the horizontal position, in which attitude the device is not in a condition to receive a drill for sorting and storage.

Thus as seen in Fig. 1, I prefer to include a second tension spring 77, the lower extremity of which is anchored at 78 to a post mounted in the side wall of the base 5, and which has its upper end secured to an inwardly projecting post mounted, at 79 in Fig. 2, on the inside surface of the triangular lever 14. Thus the spring 77 passes between 14 and the side wall of 5 to permit of which the boss 71 has commensurate axial length.

The spring 77, as may be seen in Fig. 1, constrains the lever 14 to move in a clockwise sense and thus, normally, to retain it in the position in which it engages the stop tab 72. It is apparent that, in this position of the lever 14, the gauging element 3 is in the proper quiescent position for the reception of a drill.

To operate the drill sorter the user now has merely to deliver the drill to the hopper 44 and then, as soon as the drill has stopped in the portal 30, to depress the finger plate 74. The gauging element 3 snaps into the horizontal position with an impact that ensures that the drill readily commences to roll down the aperture 32. As soon as the drill has become stationary at the excluding step in the aperture the operator releases 74; whereupon 14 is returned to its quiescent position by the spring 77. As a result 3 snaps back to its original inclined position, being arrested by the stop tab 64 with an impact that releases the drill from engagement with the step in 35. The drill then slides into its designated slot.

The device is now automatically in the proper posture for receiving another drill.

Although I have chosen a particular embodiment of my invention for the purpose of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. Apparatus for sorting cylindrical objects according to their diameters, comprising a first elongated gauging member having a flat upper surface, a second elongated gauging member overlying said first gauging member and substantially parallel thereto, said second gauging member having an under surface, tapered lengthwise and extending the full width of the second gauging member, defining a generally wedge-shaped opening between said gauging members, means holding said gauging members together forming an elongated gauging assembly, means rotatively supporting said assembly at each end thereof, with the lengthwise dimension of the elongated assembly substantially horizontal, whereby said assembly is rotatable about a substantially horizontal, lengthwise axis of rotation, stop means limiting said rotation to an acute angle between first and second positions of said assembly, in said first position said flat upper surface sloping from one side to the other and in said second position said flat upper surface being approximately level from side to side but sloping lengthwise from the larger end of said wedge-shaped opening downward toward the smaller end of said wedge-shaped opening, means biasing said assembly to said first position, hopper-and-guide means for introducing the cylindrical objects to be sorted, one at a time, endwise, from one side of said assembly downward along said flat upper surface into the larger end of said wedge-shaped opening, means for rotating said assembly temporarily to said second position permitting the so-introduced object to roll under the influence of gravity along said flat surface toward the smaller end of said wedge-shaped opening until it is stopped by contact with the under surface of said gauging member, the cylindrical object moving endwise downward under the influence of gravity out of said wedge-shaped opening upon return of said assembly to said first position responsive to said biasing means, and a rack disposed below said wedge-shaped opening for receiving the cylindrical objects therefrom, whereby the objects are sorted to various positions within said rack according to their diameters.

2. Apparatus as in claim 1, additionally comprising a manually operated toggle mechanism connected to said gauging assembly for causing a snap-action motion of the gauging assembly from said first position to said second position and return, the angle of rotation between said positions being approximately 45°.

3. Apparatus as in claim 1, additionally comprising a rocker pivotally mounted upon said gauging assembly, a plurality of fingers attached to said rocker, said fingers extending into the larger end of said wedge-shaped opening and preventing the cylindrical object introduced therein from rolling prematurely toward the smaller end of said opening, and means automatically operating said rocker to withdraw said fingers from said opening upon movement of said gauging assembly to said second position.

4. Apparatus for sorting drills according to their diameters, comprising a first elongated gauging member having a flat upper surface, a second elongated gauging member overlying said first gauging member and substantially parallel thereto, said second gauging member having an under surface, tapered lengthwise and extending the full width of the second gauging member, defining a generally wedge-shaped opening between said gauging members, means holding said gauging members together forming an elongated gauging assembly, a stationary supporting framework, two rotatable connections at opposite ends of said gauging assembly rotatively mounting said assembly upon said framework, said rotatable connections being in longitudinal alinement with respect to said assembly, substantially equidistant from said flat surface, and the one nearest the larger end of said wedge-shaped opening being higher than the other rotatable connection with respect to the horizontal, whereby said gauging assembly is rotatable about a longitudinal axis of rotation which is substantially parallel to said flat surface and is somewhat inclined to the horizontal, stop means limiting the rotation of said assembly to an angle of approximately 45° between a first position and a second position, in said first position said flat upper surface sloping from one side to the other at an angle of approximately 45° and in said second position said flat upper surface being approximately level from side to side but sloping lengthwise from the larger end of said wedge-shaped opening downward toward the smaller end of said wedge-shaped opening, a spring biasing said gauging assembly to said first position, hopper-and-guide means having a lower, discharge end alined with the larger end of said wedge-shaped opening when said assembly is in said first position for introducing the drills to be sorted endwise downward along said flat surface into said wedge-shaped opening, manually operated means for rotating said assembly to said second position permitting the so-introduced drill to roll under the influence of gravity along said flat surface toward the smaller end of said wedge-shaped opening until said drill is stopped by contact with the under surface of said second gauging member, the drill moving endwise downward under the influence of gravity out of said wedge-shaped opening upon return of said assembly to said first position responsive to said spring biasing means, a stationary plate mounted upon said framework, said plate having a sloping upper surface substantially coplanar with the upper surface of said first gauging member when the gauging assembly is in said first position, and a plurality of parallel fins upon the upper surface of said plate, said fins extending up and down the slope of said plate defining a plurality of side-by-side channels for receiving drills of various sizes from said wedge-shaped opening.

References Cited in the file of this patent

UNITED STATES PATENTS 1,245,584   Hallock _____ Nov. 6, 1917